Patented July 17, 1951

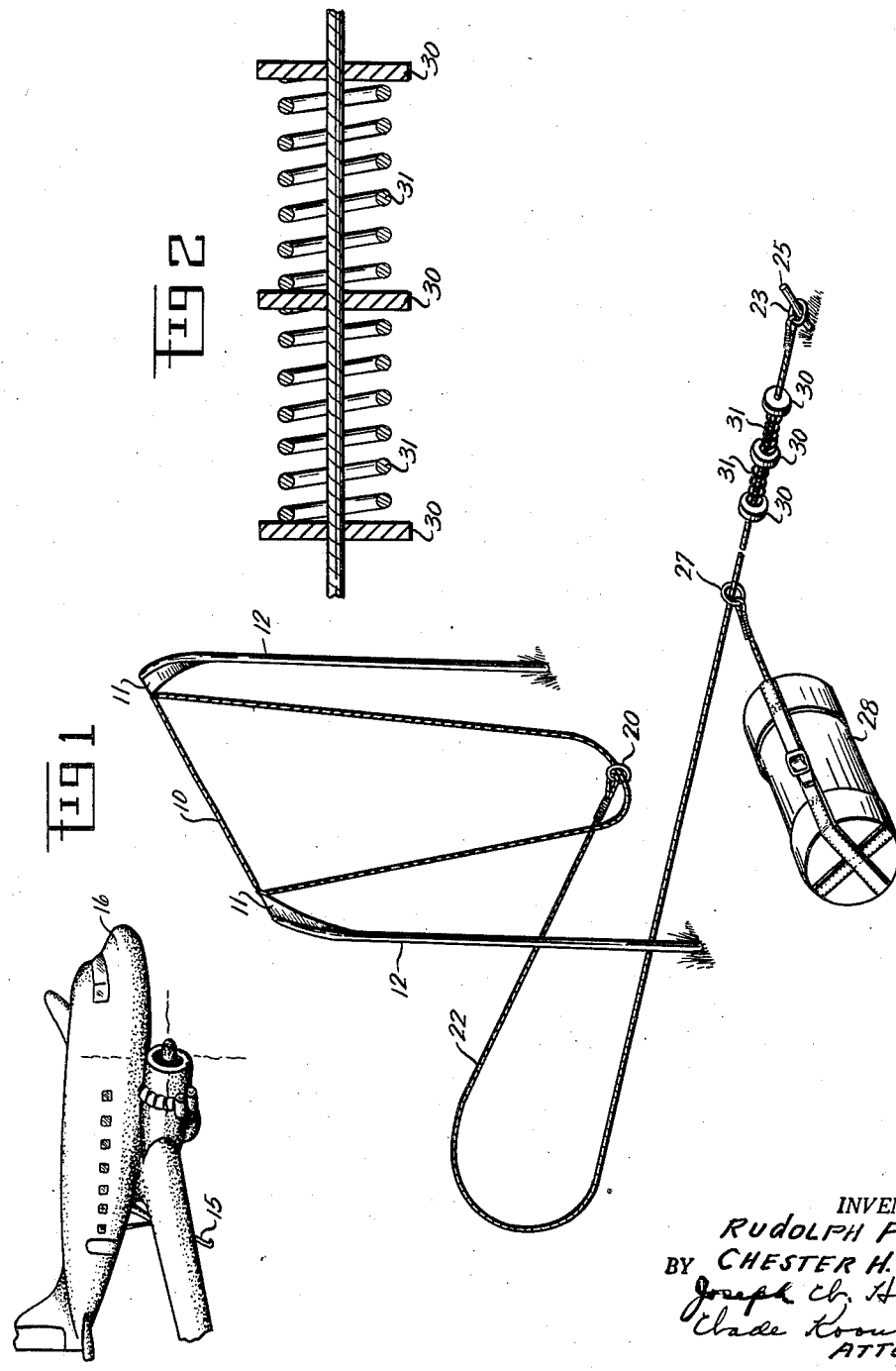

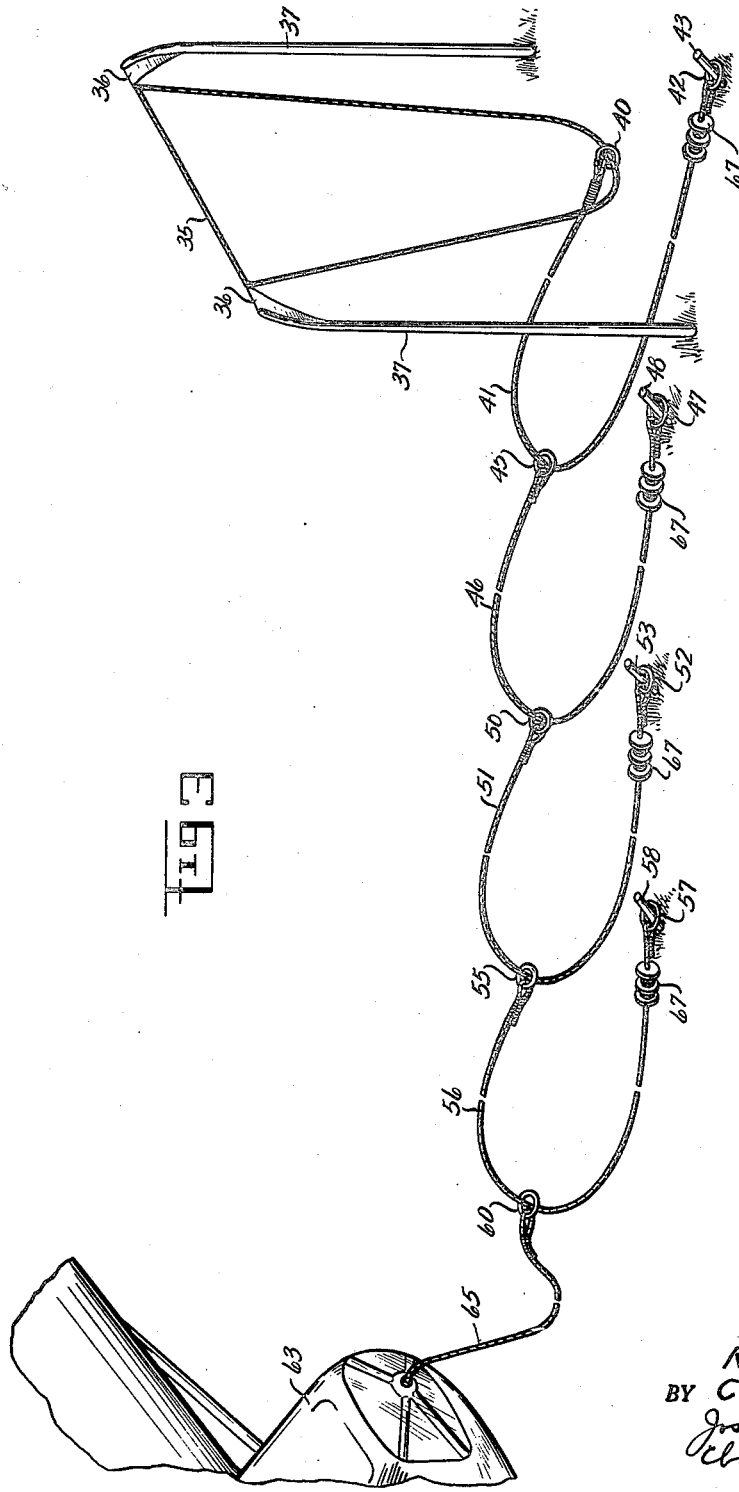

2,560,563

UNITED STATES PATENT OFFICE 2,560,563

AERIAL PICKUP

Rudolph Fink, Osborn, Ohio, and Chester H. Webb, Friendly, W. Va.

Application November 17, 1944, Serial No. 563,978

14 Claims. (Cl. 258—1.2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to aerial pickups adapted to transfer a stationary load to a moving airplane.

One object of the present invention is to provide an aerial pickup which will increase the speed of the article picked up from zero to plane speed by increments.

Another object is to provide an aerial pickup which will reduce the shock incident to transferring an article from a stationary position to a moving airplane.

A further object is to provide an aerial pickup which will enable an airplane to pick up a glider from a stationary position and increase the speed thereof by increments.

Further objects of the invention will become apparent upon considering the following specification which, when taken in connection with the accompanying drawings, illustrate preferred forms of the invention.

In its broad aspect the invention comprises a point fixed on the ground, a tow rope, means releasably securing one end of the tow rope to said point on the ground, means on the opposite end of said tow rope adapted to be engaged from a moving airplane, connecting means slidably carried on said tow rope intermediate the ends thereof, and a load member connected with said connecting means.

In the drawings:

Fig. 1 is a perspective view of a cargo pickup showing the airplane about to make contact with the pickup loop;

Fig. 2 is an elevational cross sectional view through the shock absorber shown in Fig. 1; and Fig. 3 is a perspective view of a multistage pickup for a glider or the like.

Referring particularly to Figs. 1 and 2, the pickup is shown as being composed of a loop 10 mounted between flags 11, 11 carried by posts 12, 12. The connection between the loop 10 and the flags 11, 11 may comprise any easily releasable or frangible connection so that the loop will release from its fastenings when engaged by a hook 15 carried by an airplane 16.

The loop 10 has a ring 20 mounted thereon so that the ring can slide freely on the loop depending on the portion of the loop engaged by the hook 15. The ring 20 has a tow rope 22 secured thereon at one end of the rope, the rope 22 terminating in a second ring 23 engageable over a stake 25 driven in the ground. The stake 25 is driven in the ground at such an angle that when pull is exerted by the airplane through the loop 10 by tow rope 22 in the direction of the travel of the tow plane, the ring 23 will disengage from the stake permitting the tow rope to be carried away by the plane. A ring 27 is mounted on the tow rope 22 intermediate the ends thereof and carries a cargo container 28 or live cargo such as a human in a suitable harness.

The rope 22 and the loop 10 are preferably made of a highly elastic material such as a nylon rope in order to reduce the shock incident to changing speed. A shock absorber comprising a plurality of blocks 30 is slidably mounted on the rope and has springs 31 mounted between the blocks so that when the ring 27 strikes the end block 30 there will be a further cushioning action over and above that attained from a stretch of the nylon rope 22.

It will be noted that the present arrangement shown in Figs. 1 and 2 transfers a cargo from a stationary position to half speed substantially when the rope 22 exerts its initial pull on the ring 27, in a manner similar to that of a single block pulley and that the second increment or full speed is obtained as the ring 23 leaves the stake 25.

When more gradual increase of speed is desirable, as for example in towing a glider, a two, three or a higher stage pickup may be used. Fig. 3 shows a four stage pickup for a glider. Referring to that figure, a pickup loop 35 is supported from guide flags 36 supported on posts 37.

The loop 35 has a ring 40 slidably mounted thereon. The ring 40 has a rope 41 fixed thereto at one end thereof, the other end of the rope 41 being secured to a ring 42 which is received on a stake 43 driven in the ground.

A ring 45 is slidably mounted on the rope 41 and has a rope 46 fixed thereto at one end. The opposite end of the rope is fixed to a ring 47 which ring is held on a stake 48 driven in the ground.

The rope 46 has a ring 50 slidable thereon which has a rope 51 connected to it at one end thereof. The opposite end of the rope 51 is connected with a ring 52 which passes over a stake 53 driven in the ground.

The rope 51 has a ring 55 slidable thereon which has a rope 56 connected thereto at one end thereof. The opposite end of the rope is secured to a ring 57 which passes over a stake 58 driven in the ground.

A ring 60 is slidable on the rope 56 and is secured to the glider 63 or other load by a rope 65.

In order to lessen the shock incident to change of speed, a shock absorber 67 may be mounted on each of the ropes 41, 46, 51 and 56. The shock absorber may be similar to that shown in Fig. 2 if desired. To further cushion the shock, the ropes are preferably made of nylon or other material having a large percentage of stretch combined with high strength.

*Operation*

The system is set up with the stake 25 sloping upwardly and in the direction of travel of the airplane. The ring 23 is placed over the stake 25 and the cargo container mounted on the rope 22 at a distance preferably not less than 12 to 15 feet from the stake 25. A suitable length of rope 22 is interposed between the rings 20 and 23. The length of the rope 22 depends upon the inherent elasticity and stretch in the rope, a shorter rope being required in the event the rope is highly elastic. The plane 16, having the hook 15 dependent therefrom, passes over the loop 10 and engages the loop 10 with the hook 15. When the rope 22 exerts a force on the ring 27, it moves that ring at a speed one-half that of the plane 16, the container therefor moves at a speed one-half that of the plane until the ring 27 engages the shock absorber 30. Substantially at this point the ring 23 pulls off the stake 25 and increases the speed of the cargo 28 to full speed of the plane. The shock absorber 30, 31 reduces the shock incident to the latter change, the shock being further reduced by a stretch of the rope 22.

If desired human cargo can be strapped in suitable harness and substituted for the cargo 28.

In the four stage pickup shown in Fig. 3 the glider starts from rest and attains a speed one sixteenth that of the towing airplane as the pull travels through the ropes 41, 46, 51 and 56. When the ring 42 pulls off the stake 43, the mechanical advantage travels through the ropes 46, 51 and 56 and the speed is accordingly increased to one eighth of plane speed. When the ring 47 pulls off the stake 48 the speed of the plane is again increased, this time to one quarter plane speed. When the ring 52 pulls off the stake 53 the speed of the plane increases to one-half plane speed and when the ring 57 pulls off the stake 58 the glider attains full speed.

It will be noted that while a four step pickup system is shown a greater or lesser number of steps between zero and plane speed can be obtained by simply adding or subtracting from the number of stages in the system as shown in Fig. 3.

It is realized that the invention is susceptible to various changes and modifications and that such changes in size, shape and arrangement of parts may be made as fall within the scope of the appended claims.

That which is claimed as new and is desired to be secured by Letters Patent is:

1. A pickup device to transfer a stationary load to a moving airplane comprising, a stake driven in the ground, a ring on said stake, a tow rope connected at one end thereof to said ring, means on the opposite end of said tow rope engageable by said airplane, connecting means freely slidable on said tow rope, a load member connected with said connecting means and a shock absorber mounted on said tow rope between said ring and said connecting means.

2. A pickup device to transfer a stationary load to a moving airplane comprising, a stake driven in the ground, a ring on said stake, a tow rope connected at one end thereof to said ring, a loop connected to the opposite end of said rope, means to maintain said loop suspended in the air in position to be engaged by said airplane, connecting means freely slidable on said tow rope and a load member connected with said last means.

3. A pickup device to transfer a stationary load to a moving airplane comprising, a stake driven in the ground, a ring on said stake, a tow rope connected at one end thereof to said ring, a loop connected to the opposite end of said rope, means to maintain said rope suspended in the air in position to be engaged by said airplane, connecting means freely slidable on said tow rope, a load member connected with said last named member and a shock absorber mounted on said rope between said connecting means and said ring.

4. A pickup device to transfer a stationary load to a moving airplane comprising, a stake driven in the ground, a first named ring on said stake, a tow rope connected at one end thereof to said ring, a second named ring connected to said rope at the opposite end thereof, a rope loop passing through said second named ring and freely slidable therethrough, means to support said loop in the air in a position to be engaged by the moving airplane, connecting means freely slidable on said tow rope between said rings, and a load member joined to said connecting means.

5. A pickup device to transfer a stationary load to a moving airplane comprising, a stake driven in the ground, a first named ring on said stake, a tow rope connected at one end thereof to said ring, a second named ring connected to said rope at the opposite end thereof, a rope loop passing through said second named ring and freely slidable therethrough, means to support said loop in the air in a position to be engaged by the moving airplane, connecting means freely slidable on said tow rope between said rings, a load member joined to said connecting means and a shock absorber mounted on said rope between said connecting means and said first named ring.

6. A pickup device to transfer a stationary load to a moving airplane comprising, a stake driven in the ground, a first named ring on said stake, a tow rope connected at one end thereof to said ring, a rope loop secured to the opposite end of said tow rope, means to support said loop in the air in a position to be engaged by the airplane, a second named ring slidably mounted on said tow rope between said loop and said first named ring, a load member connected with said second named ring.

7. A pick-up device to transfer a stationary dead load to a moving airplane comprising, a tow rope arranged substantially in the direction of the line of flight, releasable means securing one end of said tow rope to a fixed point on the ground and adapted to release said end upon motion thereof responsive to tension in said rope, means on the opposite end of said rope engageable by said airplane, connecting means freely slideable on said rope and adapted to be secured to a load member, the arrangement being such that said engageable end of the rope and releasable end of the rope are disposed forwardly of said load member with respect to the line of flight subsequent to pick-up of said engageable means but prior to forward acceleration of said load member.

8. A pick-up device to transfer a stationary dead load to a moving airplane comprising, a tow rope, releasable means securing one end of said tow rope to a fixed point on the ground and adapted to release said end upon motion thereof responsive to tension in said rope, means on the opposite end of said tow rope engageable by said airplane, connecting means freely slideable on said rope and adapted to be secured to a load member, said rope being arranged with respect to the load member so that the ends of said rope are disposed forwardly of said load member with respect to the direction of travel of said airplane subsequent to pick-up of said engageable means but prior to forward acceleration of said load member.

9. In a device as set forth in claim 8, wherein said releasable means comprises a stake secured to ground and a ring loosely encompassing said stake and secured to said one end of said rope.

10. In a device as set forth in claim 8, wherein said connecting means comprises a ring loosely encompassing said tow rope.

11. In a device as set forth in claim 8, wherein said means engageable by said aircraft comprises a loop adapted to be suspended in air, said loop being secured to said opposite end of said rope.

12. A pick-up device to transfer a stationary load to a moving aircraft, comprising a plurality of tow ropes, each of said ropes having releasable means securing said rope at one end to the ground, all said releasable means being adapted to release a respective end upon motion thereof in the direction of travel of said aircraft responsive to tension in respective ropes, the first of said ropes having means for engaging a moving aircraft, means freely slideable on the last of said ropes and adapted to be secured to a load member, and freely slideable means on all other of said ropes connecting said ropes in seriatim order whereby tension is transmitted in progressively increasing degree from the first to the last of said ropes.

13. A pickup device to transfer a stationary load to a moving airplane comprising, a tow rope, releasable means securing one end of said tow rope to a fixed point on the ground, and adapted to release said end in the direction of the travel of the plane, a loop on the opposite end of said tow rope, means releasably supporting said loop in the air in position to be engaged by the airplane, connecting means freely slidable on said rope, and a load member connected with said connecting means.

14. A pickup device to transfer a stationary load to a moving airplane comprising, a tow rope, releasable means securing one end of said tow rope to a fixed point on the ground, and adapted to release said end in the direction of the travel of the plane, a loop on the opposite end of said tow rope, means releasably supporting said loop in the air in position to be engaged by the airplane, connecting means freely slidable on said tow rope, a load member connected with said connecting means, and a stock absorber between said connecting means and said releasable means.

RUDOLPH FINK.
CHESTER H. WEBB.

REFERENCES CITED

The following references are of record in the file of this patent:

UNITED STATES PATENTS

| Number | Name | Date |
|---|---|---|
| 1,479,222 | Cabot | Jan. 1, 1924 |
| 2,141,536 | Kilton | Dec. 27, 1928 |
| 2,306,690 | Du Pont et al. | Dec. 29, 1942 |
| 2,334,979 | Adams | Nov. 23, 1943 |
| 2,395,172 | Dean | Feb. 19, 1946 |